Patented May 18, 1937

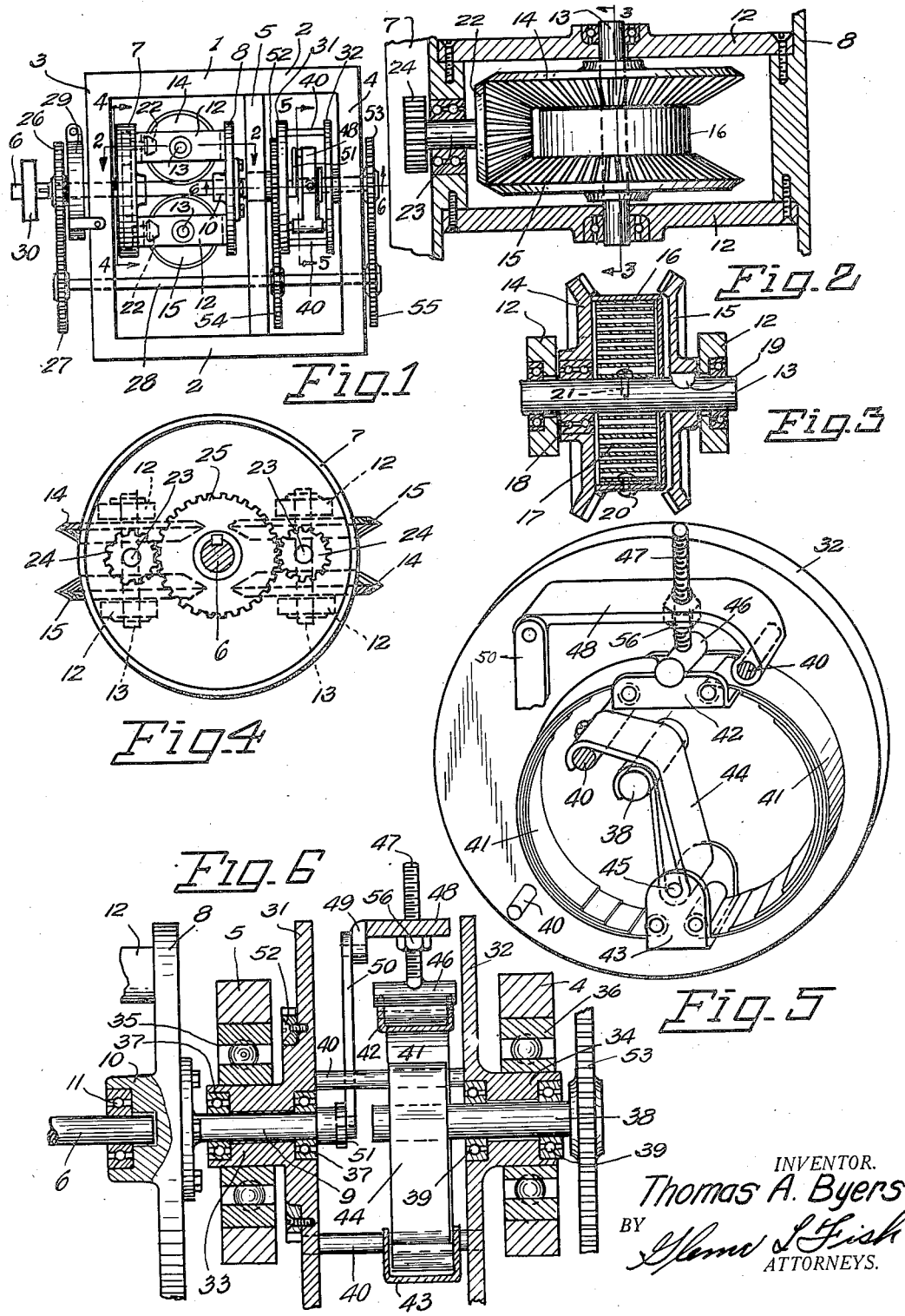

2,080,651

UNITED STATES PATENT OFFICE 2,080,651

SPRING MOTOR

Thomas A. Byers, Spokane, Wash.

Application February 15, 1936, Serial No. 64,126

1 Claim. (Cl. 185—37)

This invention relates to a spring motor and one object of the invention is to provide a motor having an improved arrangement of gears and springs so arranged that companion units constituting the motor and interconnected with each other will serve very effectively to generate power which may be transmitted from the motor by a pulley and belt or equivalent power transmitting means.

Another object of the invention is to provide a motor having an improved arrangement of power developing springs for the companion units and improved means for tensioning the springs so that rotary motion will be transmitted from them through interconnected shafts and gears.

Another object of the invention is the production of a spring motor so constructed that when the springs are tensioned and the motor set in operation it will continue to operate over a great length of time.

The invention is illustrated in the accompanying drawing, wherein:

Figure 1 is a top plan view of the improved motor.

Figure 2 is a fragmentary sectional view taken through a portion of one unit of the motor along the line 2—2 of Figure 1.

Figure 3 is a sectional view taken transversely through Figure 2 along the line 3—3.

Figure 4 is a sectional view taken along the line 4—4 of Figure 1.

Figure 5 is a sectional perspective view taken transversely through the second unit of the motor along the line 5—5 of Figure 1.

Figure 6 is a sectional view upon an enlarged scale taken longitudinally through the second unit upon the line 6—6 of Figure 1.

This improved motor has a frame 1 formed of metal or any other desired material having sufficient strength and provided with side bars 2 and end bars 3 and 4. A cross bar 5 extends between the side bars with its ends secured thereto in any desired manner. A unit is carried by the frame between the end bar 3 and the cross bar 5 and a second unit between the cross bar and the end bar 4. These units are interconnected and cooperate with each other to generate the power.

The first unit has a main shaft 6 journaled through the end bar 3 and within the frame carrying a drum 7 and a disk 8, the disk 8 being provided with a stub shaft 9 journaled through the cross bar 5 and rotatably mounted in a manner to be hereinafter more fully described. At its center the disk 8 is formed with a hub 10 and upon referring to Figure 6 it will be seen that this hub carries a bearing 11 in which the inner end of the shaft 6 is rotatably mounted. Arms or bars 12 which are arranged in pairs, as shown in Figures 1 and 3, extend between the drum 7 and the disk 8 with their ends firmly secured thereto and as the drum and disk are loose upon the shaft 6 they may have rotary motion relative to the shaft when the motor is in operation and the shaft turned relative to them for a winding operation.

Between each pair of bars 12 extends a shaft 13 carrying beveled gear-plates 14 and 15 between which is located a casing 16 which encloses a spring 17. The gear 14 is mounted to turn freely about the shaft 13 by a bearing 18 and has the spring casing 16 welded to it and the gear 15 is keyed to the shaft, as shown at 19, the spring having its outer end anchored to the casing by a rivet 20 and the inner end of the spring being secured to the shaft by a screw 21. Between the gears 14 and 15 is disposed a beveled pinion 22 which meshes with both gears and is fixed to a shaft 23 journaled through the drum and carrying a pinion 24 at its forward end. The two gears or pinions 24 are spaced from each other diametrically of the drum and mesh with a large gear 25 keyed to the shaft 6 and, when the shaft 6 is turned during a winding operation, the shafts 23 will be rotated and each transmit rotary motion to the gears 14 and 15 with which it meshes. These gears 14 and 15 are turned in opposite directions and, therefore, winding motion will be imparted to each spring 17 from both ends. A large gear 26 is keyed to the shaft 6 to turn with the shaft but permit shifting of the gear along the shaft out of position to mesh with a gear 27 carried by a shaft 28. The gear 26 is shifted out of engagement with the gear 27 during a winding operation and in order that retrograde rotation may be prevented during the winding operation, there has been provided a brake 29 consisting of a drum fixed to the shaft and a gripping band about the drum. A pulley 30 is fixed to the shaft 6 in order that a belt may be engaged about the pulley and rotary motion transmitted from the motor to apparatus to be operated but it is to be understood that any equivalent power transmitting means may be used instead of the pulley.

The second unit of the motor is illustrated in Figures 5 and 6 and includes disks 31 and 32 having hubs 33 and 34 extending through the cross bar 5 and end bar 4 and rotatably mounted in bearings 35 and 36. The stub shaft 9 of the disk 8 extends through the hub 33 axially thereof and is rotatably mounted in bearings 37 and a shaft 38 extends axially through the hub 34 and is rotatably mounted in bearings 39. Rods 40 serve as connecting means for the disks 31 and 32 so that they will rotate together.

Turning motion is to be imparted to the shaft 38, and in order to do so there has been provided longitudinally curved leaf springs 41 which are disposed between the disks 31 and 32 and have their upper ends connected with a bracket or clevis 42 and their lower ends connected with a bracket or clevis 43. A strap 44 is doubled intermediate its length and engaged about a pin or rod 45 with its end portions extending upwardly from the clevis and has one end secured to a rod 40 while its other end is wrapped about and secured to the shaft 38. The clevis 42 is engaged by the cross head 46 of a threaded stem 47 which passes through an opening formed in a plate 48 pivoted at one end to a rod 40 and having its other end formed with a depending ear 49 to which the upper end of a link 50 is pivotally mounted. The lower end of the link is pivoted to an arm 51 carried by and extending radially from the rear end of the stub shaft 9 and pull exerted downwardly upon the link 50 by the arm 51 will tend to swing the plate downwardly and cause the cross head of the stem 47 to apply pressure upon the clevis 42 to tension the leaf springs and cause pull to be exerted upon the looped strap which tends to unwind the strap from the shaft 38 and rotate the shaft. A gear 52 carried by the disk 31 and a gear 53 carried by the shaft 38 mesh with gears 54 and 55 carried by the shaft 28 and when the gear 26 is shifted into position to mesh with the gear 27, the shaft 28 will be in geared connection with both the first unit and the second unit. A nut 56 carried by the stem 47 and bearing against the under face of the plate 43 permits the stem to be shifted vertically and initial tension of the leaf springs controlled.

When this spring motor is in use the gear 26 is shifted out of engagement with the gear 27, the first unit held against rotation about the shaft 6, and the shaft 6 turned by hand in a direction to rotate the shafts 23 and transmit rotation to the gears 14 and 15 to wind the springs 17. After the springs have been fully wound by manual rotation of the shaft 6, the gear 26 is shifted into position to again mesh with the gear 27. Power from the first unit is transferred to the second unit by the arm 51 and link 50 which is drawn downwardly to exert pull upon the plate 48 and compress the leaf springs 41 so that they exert pull upon the strap 44 which tends to rotate the shaft 38 and since the shaft 38 has a geared connection with the shaft 6, rotary motion will be transmitted to the shaft 6 in a direction to wind the springs of the first unit and added power will be imparted to the first unit. The first unit revolves around the shaft 6 when released without unwinding the springs 17 and, therefore, these springs will be maintained under tension and the interconnected gears and shafts will cause rotary motion to be transmitted to the shaft 6 for an extended period of time.

Having thus described the invention, what is claimed is:

In a spring motor, a frame having spaced bars, inner and outer disks in said frame between the bars having hubs journaled through the bars, inner and outer shafts journaled through the hubs of said disks in axial alinement with each other, rods connecting said disks, a crank arm extending from the inner shaft radially thereof, a looped strap having one end wrapped about the outer shaft and having its other end secured to one of said rods, a clevis engaged through the loop of said strap, longitudinally bowed leaf springs having their lower ends connected by said clevis, a clevis connecting upper ends of said springs, a lever pivoted to one of said rods and extending horizontally over said springs, a stem threaded through said lever and having a head at its lower end bearing against the upper clevis to initially tension the springs, a link connecting said crank arm with said lever for exerting pull upon the lever to compress the leaf springs and exert pull upon the looped strap to rotate the outer shaft, and a counter shaft having geared connections with the outer shaft and the inner disk.

THOMAS A. BYERS.